(12) United States Patent
Brocheton

(10) Patent No.: US 10,336,647 B2
(45) Date of Patent: Jul. 2, 2019

(54) HOLMIUM-BASED CONTRAST ENHANCING UV BLOCKING GLASS COMPOSITIONS

(71) Applicant: Corning Incorporated, Corning, NY (US)

(72) Inventor: Yves Andre Henri Brocheton, Samoreau (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/840,758

(22) Filed: Dec. 13, 2017

(65) Prior Publication Data

US 2018/0170796 A1  Jun. 21, 2018

Related U.S. Application Data

(60) Provisional application No. 62/435,248, filed on Dec. 16, 2016.

(51) Int. Cl.
| | | |
|---|---|---|
| C03C 3/11 | (2006.01) | |
| C03C 3/095 | (2006.01) | |
| G02B 5/20 | (2006.01) | |
| G02C 7/10 | (2006.01) | |
| C03C 4/08 | (2006.01) | |
| C03B 25/02 | (2006.01) | |

(52) U.S. Cl.
CPC ............ C03C 3/11 (2013.01); C03C 4/085 (2013.01); G02B 5/208 (2013.01); G02C 7/10 (2013.01); *C03B 25/02* (2013.01)

(58) Field of Classification Search
CPC ............ C03C 3/11; C03C 3/095; C03C 10/16
USPC .......................................................... 501/13
See application file for complete search history.

(56) References Cited

U.S. PATENT DOCUMENTS

| | | | |
|---|---|---|---|
| 3,941,605 A * | 3/1976 | Yamashita | ........... C03C 4/06 501/13 |
| 4,485,178 A * | 11/1984 | Gliemeroth | ........... C03C 3/091 501/13 |
| 4,521,524 A | 6/1985 | Yamashita | |
| 4,549,894 A * | 10/1985 | Araujo | ........... C03C 4/06 501/13 |
| 4,769,347 A | 9/1988 | Cook et al. | |
| 5,039,631 A | 8/1991 | Krashkevich et al. | |
| 5,061,609 A | 10/1991 | Piggin et al. | |
| 5,077,240 A | 12/1991 | Hayden et al. | |
| 5,190,896 A | 3/1993 | Pucilowski et al. | |
| 5,242,869 A | 9/1993 | Tarumi et al. | |
| 5,446,007 A | 8/1995 | Krashkevich et al. | |
| 5,729,381 A | 3/1998 | Havens et al. | |
| 6,145,984 A | 11/2000 | Farwig | |
| 6,334,680 B1 | 1/2002 | Larson | |
| 6,604,824 B2 | 8/2003 | Larson | |
| 7,597,441 B1 | 10/2009 | Farwig | |
| 8,183,170 B2 | 5/2012 | Brocheton | |
| 8,210,678 B1 | 7/2012 | Farwig | |
| 8,733,929 B2 | 5/2014 | Chiou et al. | |
| 9,740,028 B1 | 8/2017 | Larson | |
| 9,846,307 B2 | 12/2017 | Tremblay et al. | |
| 2007/0294841 A1 | 12/2007 | Thullen et al. | |
| 2010/0073765 A1 * | 3/2010 | Brocheton | ........... C03C 3/068 359/361 |
| 2014/0151613 A1 * | 6/2014 | Brocheton | ........... C03C 3/093 252/586 |
| 2017/0068119 A1 | 3/2017 | Antaki et al. | |

FOREIGN PATENT DOCUMENTS

| | | |
|---|---|---|
| CN | 101024551 A | 8/2007 |
| WO | 2002086597 A1 | 10/2002 |

OTHER PUBLICATIONS

International Search Report and Written Opinion PCT/US2017/065948 dated Mar. 16, 2018.

* cited by examiner

*Primary Examiner* — Karl E Group

(74) *Attorney, Agent, or Firm* — Smit Kapadia; Svetlana Z. Short

(57) ABSTRACT

A UV-blocking glass material having precipitated cuprous halide crystals and including by weight percent, on an oxide basis: from 30 wt % to 65 wt % $SiO_2$; from 12 wt % to 25 wt % $B_2O_3$; from 3 wt % to 10 wt % $Al_2O_3$; from 0 wt % to 7 wt % $Na_2O$; from 0 wt % to 10 wt % $K_2O$; from 0 wt % to 5 wt % $Li_2O$; from 0.5 wt % to 10 wt % $Ho_2O_3$; from 0.25 wt % to 1.50 wt % CuO; and from 0.5 wt % to 5.0 wt % halogens.

19 Claims, 1 Drawing Sheet

HOLMIUM-BASED CONTRAST ENHANCING UV BLOCKING GLASS COMPOSITIONS

This application claims the benefit of priority under 35 U.S.C. § 119 of U.S. Provisional Application Ser. No. 62/435,248 filed on Dec. 16, 2016, the content of which is relied upon and incorporated herein by reference in its entirety.

BACKGROUND

Field

The present disclosure relates to contrast-enhancing, UV-blocking glass compositions and articles comprising the same. In particular, the present disclosure relates to $Ho_2O_3$-containing and CuX-containing glass compositions having specific cut-off in the UV and absorption at about 450 nm wavelength, and articles comprising the same. The glass compositions disclosed herein are useful, for example, in making sunglasses or display filters.

Technical Background

It is known that human eyes can perceive light irradiation in the visible range, but with differing sensitivity at differing wavelength spans. For example, unaided human eyes have the highest sensitivity at around 450 nm, 540 nm, and 610 nm. Thus, it would be useful to filter off irradiation around about 500 nm and 580 nm in order to improve the perceived color contrast.

It has proven desirable to enhance the perceived color contrast by using glass materials having special filtering properties in the visible range. Some of the color and contrast-enhancing glasses as disclosed in the prior art are $Nd_2O_3$-containing glass. It is known that $Nd_2O_3$ has an absorption band between 565-595 nm.

It is also known that UV light, including UVA and UVB, are detrimental to the health of naked human eyes. The sunglass industry has developed and provided many versions of sunglass products to the general consumers, including polarizing products, photochromic products, and the like, many of which have UV-filtering properties.

Sunglasses that are both UV-blocking and contrast-enhancing were proposed in the prior art before. However, some of such sunglasses were designed to have multiple layers in their structures, with at least one of them for the purpose of UV absorption, and at least one additional layer, typically bonded to the UV-blocking layer, to perform the contrast-enhancing function. Such multi-layer structures are costly and cumbersome to manufacture, and can present stability issues, such as delamination between the layers overtime.

Therefore, there remains a genuine need of a single glass composition that is both UV-blocking and contrast-enhancing which could be use for making sunglass lenses to protect the human vision and to improve the color perception at the same time.

SUMMARY

According to one embodiment, a UV-blocking glass material comprises precipitated cuprous halide crystals and comprises by weight percent, on an oxide basis: from greater than or equal to 30 wt % to less than or equal to 65 wt % $SiO_2$; from greater than or equal to 12 wt % to less than or equal to 25 wt % $B_2O_3$; from greater than or equal to 3 wt % to less than or equal to 10 wt % $Al_2O_3$; from greater than or equal to 0 wt % to less than or equal to 7 wt % $Na_2O$; from greater than or equal to 0 wt % to less than or equal to 10 wt % $K_2O$; from greater than or equal to 0 wt % to less than or equal to 5 wt % $Li_2O$; from greater than or equal to 0.5 wt % to less than or equal to 10 wt % $Ho_2O_3$; from greater than or equal to 0.25 wt % to less than or equal to 1.50 wt % CuO; and from greater than or equal to 0.5 wt % to less than or equal to 5.0 wt % halogens.

According to another embodiment, an article comprises a UV-blocking glass material comprising precipitated cuprous halide crystals and comprises by weight percent, on an oxide basis: from greater than or equal to 30 wt % to less than or equal to 65 wt % $SiO_2$; from greater than or equal to 12 wt % to less than or equal to 25 wt % $B_2O_3$; from greater than or equal to 3 wt % to less than or equal to 10 wt % $Al_2O_3$; from greater than or equal to 0 wt % to less than or equal to 7 wt % $Na_2O$; from greater than or equal to 0 wt % to less than or equal to 10 wt % $K_2O$; from greater than or equal to 0 wt % to less than or equal to 5 wt % $Li_2O$; from greater than or equal to 0.5 wt % to less than or equal to 10 wt % $Ho_2O_3$; from greater than or equal to 0.25 wt % to less than or equal to 1.50 wt % CuO; and from greater than or equal to 0.5 wt % to less than or equal to 5.0 wt % halogens.

In various other embodiments, the glass article may be a lens for an eyewear product, a light filter within an information display device, or a refractive lens element in an optical element.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
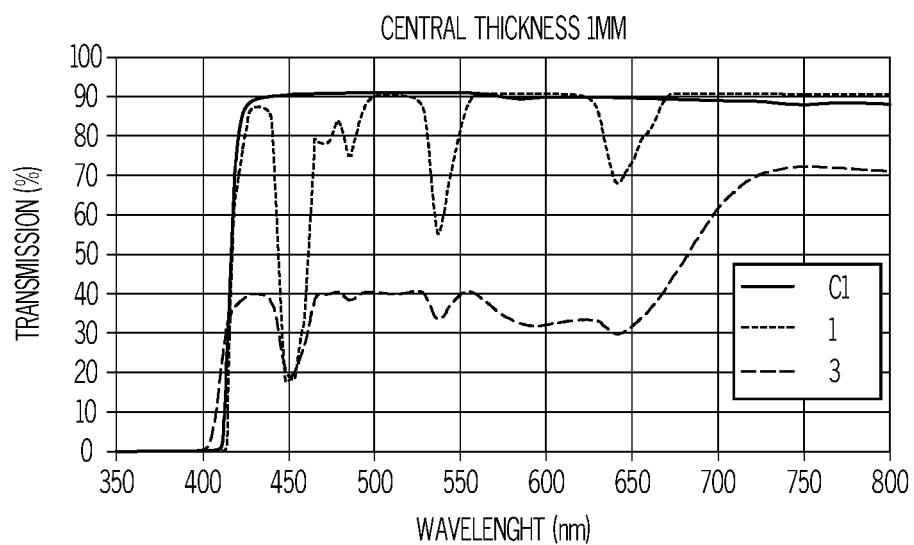
FIG. 1 is a plot of spectrums in the visible wavelength range for comparative glass samples and glass samples according to embodiments disclosed and described herein having a thickness of 1 mm.

Reference will now be made in detail to embodiments of holmium based contrast enhancing glass compositions, and articles comprising holmium based contrast enhancing glass compositions. In one embodiment a UV-blocking glass material comprises precipitated cuprous halide crystals and comprises by weight percent, on an oxide basis: from greater than or equal to 30 wt % to less than or equal to 65 wt % $SiO_2$; from greater than or equal to 12 wt % to less than or equal to 25 wt % $B_2O_3$; from greater than or equal to 3 wt % to less than or equal to 10 wt % $Al_2O_3$; from greater than or equal to 0 wt % to less than or equal to 7 wt % $Na_2O$; from greater than or equal to 0 wt % to less than or equal to 10 wt % $K_2O$; from greater than or equal to 0 wt % to less than or equal to 5 wt % $Li_2O$; from greater than or equal to 0.5 wt % to less than or equal to 10 wt % $Ho_2O_3$; from greater than or equal to 0.25 wt % to less than or equal to 1.50 wt % CuO; and from greater than or equal to 0.5 wt % to less than or equal to 5.0 wt % halogens. Various holmium based contrast enhancing glass compositions will be described herein.

As used herein, the term "consisting essentially of," means that the material of the present disclosure may comprise components in addition to those listed, as long as those additional components, in their added amounts, do not alter the basic features of glass holmium based contrast enhancing glass compositions according to embodiments, i.e., the combination of effective UV absorption and contrast-enhancement.

Light transmission values provided in this disclosure are those measured at about 1 mm or about 2 mm sample thickness without correcting surface reflection loss.

In this disclosure, the weight percentages of oxides in a glass composition are those expressed in terms of the identified oxide, and the weight percentages of halogen(s) (such as, for example, Br) in a glass composition are those expressed in terms of the identified halogens(s), regardless of the valencies of the metals or halogen in the composition. For example, the amount of Fe in the glass composition is calculated in terms of $Fe_2O_3$, even though Fe in the glass may be present in the form of $Fe^{2+}$ and $Fe^{3+}$. As another example, the amount of Sn in the glass composition is calculated in terms of SnO, even though Sn in the glass may be present in the form of $Sn^{2+}$ and $Sn^{4+}$. As yet another example, the total amount of Cu in the glass is expressed in terms of CuO, even though the glass may be present in the glass in the form of $Cu^{2+}$, $Cu^+$ and $Cu^0$.

In many applications, such as, for example, in lenses for sunglasses, it is desired to enhance the contrast of target subjects with respect to background radiation. In addition, it is often desired to lower the UV radiation transmitted through a given glass, especially those with a wavelength shorter than about 380 nm, which are especially harmful for the naked human eye. To that end, $Ho_2O_3$, when introduced into a glass, can work to improve the color contrast due to its natural combination of absorption bands in the visible region. In contrast enhancement glasses containing $Ho_2O_3$, it is also desired that the radiation coming from a desired subject maintain the true perceived color of the latter on passage through the glass and that the image of the subject be sharp. Glasses with such properties would be especially useful for the ophthalmic lenses, including plano lenses (such as sunglass lenses) and prescription lenses.

In addition to the contrast enhancing $Ho_2O_3$, glass compositions of embodiments may include UV-blocking agents such as, for example, CuX, $Fe_2O_3$, $CeO_2$, $TiO_2$, and combinations thereof. It should be noted that materials may act as either UV-blocking agents or coloring agents depending on how the glass is formed. For instance, CuO may be added to a glass composition as a coloring agent, not as a UV-blocking agent. In order for CuO to act as a UV-blocking agent, the glass composition should be formed to facilitate the formation of cuprous halides. As an example, it is known that for the CuO component in a glass composition to be a UV-blocking agent, CuX (where X is a halide, such as, for example, fluorine, chlorine, bromine, iodine, and combinations thereof) crystals must be formed in the glass. CuX crystals are typically formed by heat treating the glass at an elevated temperature such as at around or above 600° C. In addition to the processing conditions, certain other components in the glass composition aid in the formation of UV-blocking halides, such as, for example, $B_2O_3$. Without the formation of cuprous halides, the CuO in the glass composition will act as a coloring agent and not a UV-blocking material.

The glass compositions of embodiments are borosilicate glass compositions. According to embodiments, $SiO_2$ is the primary glass network former. In embodiments, the glass composition may comprise $SiO_2$ in amounts from greater than or equal to 30 wt % to less than or equal to 65 wt %, such as from greater than or equal to 35 wt % to less than or equal to 60 wt %, greater than or equal to 40 wt % to less than or equal to 55 wt %, greater than or equal to 45 wt % to less than or equal to 50 wt %, and any ranges or subranges within the preceding ranges.

$B_2O_3$ is employed to aid the melting of the glass and for the formation and precipitation of CuX crystals in the glass when the glass is heat treated. However, if the $B_2O_3$ content is too high, it could lead to inordinate dissolution of the tank refractory material, causing deleterious inclusion in the glass and severe tank wear. In addition, the durability of the glass may suffer if too much $B_2O_3$ is included in the glass composition. In embodiments, the glass composition may comprise $B_2O_3$ in amounts from greater than or equal to 12 wt % to less than or equal to 25 wt %, such as greater than or equal to 15 wt % to less than or equal to 23 wt %, greater than or equal to 17 wt % to less than or equal to 21 wt %, greater than or equal to 15 wt % to less than or equal to 23 wt %, greater than or equal to 17 wt % to less than or equal to 21 wt %, and any ranges or subranges within the preceding ranges.

$Al_2O_3$ is included in the glass to increase durability of the glass and to reduce the likelihood of devitrification of the glass. If too much $Al_2O_3$ is included, the glass may become difficult to melt. In embodiments, the glass composition may comprise $Al_2O_3$ in amounts from greater than or equal to 3 wt % to less than or equal to 10 wt %, such as greater than or equal to 5 wt % to less than or equal to 9 wt %, greater than or equal to 6 wt % to less than or equal to 9 wt %, greater than or equal to 7 wt % to less than or equal to 9 wt %, and any ranges or subranges within the preceding ranges.

Alkali metal oxides also enhance the meltability of the glass. In some embodiments, the glass compositions may be chemically strengthened, such as, for example, by an ion exchange treatment, due to the presence of $Na_2O$ in the glass composition. In embodiments, the glass composition may comprise $Na_2O$ in amounts from greater than or equal to 0 wt % to less than or equal to 7 wt %, greater than or equal to 2 wt % to less than or equal to 6 wt %, greater than or equal to 3 wt % to less than or equal to 5 wt %, and any ranges and subranges within the preceding ranges.

In embodiments, the amount of $K_2O$ in the glass composition is maintained relatively low if the glass composition is to be chemically strengthened as $K_2O$ generally has a negative impact on the ion exchange process. In embodiments, the glass composition may comprise $K_2O$ in amounts from greater than or equal to 0 wt % to less than or equal to 10 wt %, greater than or equal to 2 wt % to less than or equal to 8 wt %, greater than or equal to 3 wt % to less than or equal to 7 wt %, and any ranges and subranges within the preceding ranges.

If the amount of $Li_2O$ in the glass is too high, unacceptable bulk glass crystallization can occur. Accordingly, in embodiments, the glass composition may comprise $Li_2O$ in amounts from greater than or equal to 0 wt % to less than or equal to 5 wt %, greater than or equal to 1 wt % to less than or equal to 4 wt %, greater than or equal to 1 wt % to less than or equal to 3 wt %, and any ranges and subranges within the preceding ranges.

Additionally, if the total amount of $R_2O$ (i.e., $Li_2O$, $Na_2O$, $K_2O$, $Rb_2O$ and $Cs_2O$) is too high, the glass may have an unacceptable chemical durability. Thus, in embodiments, the glass composition may comprise $R_2O$ in amounts from greater than or equal to 5 wt % to less than or equal to 20 wt %, from greater than or equal to 7 wt % to less than or equal to 18 wt %, from greater than or equal to 7 wt % to less than or equal to 16 wt %, from greater than or equal to 9 wt % to less than or equal to 14 wt %, from greater than or equal to 10 wt % to less than or equal to 12 wt %, and any ranges and subranges within the preceding ranges.

Alkaline earth metal oxides (RO)—such as, for example, MgO, CaO, SrO, and BaO—can be included in the glass to improve the chemical durability of the glass. However, if the content of RO is too high, the meltability of the glass may be negatively affected. In embodiments, the glass composition may comprise RO in amounts from greater than or equal to 0 wt % to less than or equal to 10 wt %, from greater than or equal to 0.5 wt % to less than or equal to 10 wt %, from greater than or equal to 2 wt % to less than or equal to 8 wt %, from greater than or equal to 4 wt % to less than or equal to 6 wt %, and any ranges and subranges within the preceding ranges.

$Ho_2O_3$ is the primary contrast-enhancing component in the glass compositions of embodiments. Amounts of $Ho_2O_3$ under 0.5 wt % could result in insufficient contrast, whereas amounts higher than 10 wt % generally do not improve the contrast. Accordingly, in embodiments, the glass composition may comprise $Ho_2O_3$ in amounts from greater than or equal to 0.5 wt % to less than or equal to 10 wt %, greater than or equal to 2 wt % to less than or equal to 10 wt %, greater than or equal to 3 wt % to less than or equal to 10 wt %, greater than or equal to 4 wt % to less than or equal to 10 wt %, greater than or equal to 5 wt % to less than or equal to 10 wt %, greater than or equal to 6 wt % to less than or equal to 10 wt %, greater than or equal to 7 wt % to less than or equal to 10 wt %, greater than or equal to 8 wt % to less than or equal to 10 wt %, greater than or equal to 9 wt % to less than or equal to 10 wt %, and any ranges and subranges within the preceding ranges. In other embodiments, the glass composition may comprise $Ho_2O_3$ in amounts from greater than or equal to 1 wt % to less than or equal to 9 wt %, greater than or equal to 1 wt % to less than or equal to 8 wt %, greater than or equal to 1 wt % to less than or equal to 7 wt %, greater than or equal to 1 wt % to less than or equal to 6 wt %, greater than or equal to 1 wt % to less than or equal to 5 wt %, greater than or equal to 1 wt % to less than or equal to 4 wt %, greater than or equal to 1 wt % to less than or equal to 3 wt %, greater than or equal to 1 wt % to less than or equal to 2 wt %, and any ranges and subranges within the preceding ranges. In still other embodiments, the glass composition may comprise $Ho_2O_3$ in amounts from greater than or equal to 0.5 wt % to less than or equal to 5 wt %, greater than or equal to 1 wt % to less than or equal to 4 wt %, and any ranges and subranges within the preceding ranges.

Small amounts of ZnO, $La_2O_3$, $Ta_2O_3$, $Gd_2O_3$, $Y_2O_3$, $Nb_2O_5$, $WO_3$, $MO_3$, combinations thereof, and the like, may be included, individually or in combination, in the glass composition to adjust the melting properties, refractive index, color filtering properties, abbe number, and the like, of the glass. In embodiments, the glass composition may comprise the sum of the above components in amounts from greater than or equal to 0 wt % to less than or equal to 10 wt %, from greater than or equal to 0.5 wt % to less than or equal to 10 wt %, from greater than or equal to 0 wt % to less than or equal to 7 wt %, from greater than or equal to 0 wt % to less than or equal to 5 wt %, and any ranges and subranges within the preceding ranges.

$CeO_2$, $TiO_2$ and $ZrO_2$ may be included in the glass of embodiments to alter the meltability and refractive index to desired levels. When included, these agents contribute partly to the UV-blocking property of the glass of embodiments. However, since the UV-blocking property of the glass of embodiments is mainly provided by the cuprous halide crystals in the glass, the inclusion of these additional UV-blocking components are not required. In embodiments, the glass composition may comprise the sum of these components in amounts from greater than or equal to 0 wt % to less than or equal to 10 wt %, from greater than or equal to 0.5 wt % to less than or equal to 10 wt %, greater than or equal to 0 wt % to less than or equal to 7 wt %, greater than or equal to 0 wt % to less than or equal to 5 wt %, and any ranges and subranges within the preceding ranges. In other embodiments, the glass composition may comprise $ZrO_2$ in amounts from greater than or equal to 0 wt % to less than or equal to 8 wt %, greater than or equal to 2 wt % to less than or equal to 8 wt %, greater than or equal to 2 wt % to less than or equal to 5 wt %, and any ranges or subranges within the preceding ranges.

In embodiments, the glass may contain coloring agents such as $Nd_2O_3$, $Er_2O_3$, $Pr_2O_3$, $Fe_2O_3$ (in the form of FeO and/or $Fe_2O_3$ in the final glass), NiO, CoO (in the form of CoO and/or $Co_2O_3$ in the final glass), $V_2O_5$ (in the form of VO, $V_2O_3$, $VO_2$ and/or $V_2O_5$ in the final glass), $Cr_2O_3$, other known coloring agents, and combinations thereof, to impart the desired color and hue to the glass. It should be understood that in various embodiments one or more of the coloring agents may be added to the glass composition to provide the desired coloring properties as well as color coordinates in the color space. In some embodiments, the sum of the coloring agents in the glass composition is from greater than or equal to 0.0 wt % to less than or equal to 10.0 wt %, such as from greater than or equal to 0.5 wt % to less than or equal to 9.5 wt %, from greater than or equal to 1.0 wt % to less than or equal to 9.0 wt %, from greater than or equal to 1.5 wt % to less than or equal to 8.5 wt %, from greater than or equal to 2.0 wt % to less than or equal to 8.0 wt %, from greater than or equal to 2.5 wt % to less than or equal to 7.5 wt %, from greater than or equal to 3.0 wt % to less than or equal to 7.0 wt %, from greater than or equal to 3.5 wt % to less than or equal to 6.5 wt %, from greater than or equal to 4.0 wt % to less than or equal to 6.0 wt %, or from greater than or equal to 4.5 wt % to less than or equal to 5.5 wt %, and any ranges or subranges within the preceding ranges. In other embodiments the total amount of the coloring agents in the glass composition is from greater than or equal to 0.0 wt % to less than or equal to 5.0 wt %, such as from greater than or equal to 0.1 wt % to less than or equal to 4.5 wt %, from greater than or equal to 0.1 wt % to less than or equal to 4.0 wt %, from greater than or equal to 0.1 wt % to less than or equal to 3.5 wt %, from greater than or equal to 0.1 wt % to less than or equal to 3.0 wt %, from greater than or equal to 0.1 wt % to less than or equal to 2.5 wt %, from greater than or equal to 0.1 wt % to less than or equal to 2.0 wt %, from greater than or equal to 0.1 wt % to less than or equal to 1.5 wt %, from greater than or equal to 0.1 wt % to less than or equal to 1.0 wt %, or from greater than or equal to 0.1 wt % to less than or equal to 0.5 wt %, and any ranges or subranges within the preceding ranges.

In addition to the primary color filtering agent, $Ho_2O_3$, additional color filtering agents may be added to the glass composition of embodiments to provide contrast enhancement at various wavelengths within the visible spectrum. These additional contrast enhancing agents include, for example $Nd_2O_3$, $Er_2O_3$, $Pr_2O_3$, and combinations thereof. These additional color filtering agents may be added to the glass of embodiments in total amounts from greater than or equal to 0 wt % to less than or equal to 25 wt %, such as from greater than or equal to 0 wt % to less than or equal to 22 wt %, greater than or equal to 0 wt % to less than or equal to 20 wt %, greater than or equal to 0 wt % to less than or equal to 18 wt %, greater than or equal to 0 wt % to less than or equal to 16 wt %, greater than or equal to 0 wt % to less than or equal to 14 wt %, greater than or equal to 0 wt % to less than or equal to 12 wt %, greater than or equal to 0 wt % to less than or equal to 10 wt %, or greater than or equal to 0 wt % to less than or equal to 8 wt %, and any ranges or subranges within the preceding ranges. In other embodiments, the additional color filtering agents may be added to the glass of embodiments in total amounts from greater than or equal to 2 wt % to less than or equal to 25 wt %, such as greater than or equal to 5 wt % to less than or equal to 25 wt %, greater than or equal to 8 wt % to less than or equal to 25 wt %, greater than or equal to 10 wt % to less than or equal to 25 wt %, greater than or equal to 2 wt % to less than or equal to 12 wt %, greater than or equal to 14 wt % to less than or equal to 25 wt %, greater than or equal to 16 wt % to less than or equal to 25 wt %, greater than or equal to 18 wt % to less than or equal to 25 wt %, greater than or equal to 20 wt % to less than or equal to 25 wt %, or greater than or equal to 22 wt % to less than or equal to 25 wt %, and any ranges or subranges within the preceding ranges. In yet other embodiments, the additional color filtering agents may be added to the glass of embodiments in total amounts from greater than or equal to 5 wt % to less than or equal to 20 wt %, such as greater than or equal to 8 wt % to less than or equal to 18 wt %, or greater than or equal to 10 wt % to less than or equal to 15 wt %, and any ranges or subranges within the preceding ranges.

As mentioned above, cuprous halide (including, for example, CuF, CuCl, CuBr, CuI, and combinations thereof) serves as the main UV-blocking agent in the glass composition of embodiments. By choosing the proper amounts of CuO, halides, and reducing agents in the glass composition, in embodiments, the glass composition may have a transmission cut-off at about 400 nm, meaning that the transmission of the glass when measured on a 1 mm thick sample is essentially about 0.0%.

To achieve the desired transmission cut-off, in embodiments, the glass composition may comprise CuO in amounts from greater than or equal to 0.25 wt % to less than or equal to 1.50 wt %, greater than or equal to 0.30 wt % to less than or equal to 1.25 wt %, greater than or equal to 0.35 wt % to less than or equal to 1.00 wt %, greater than or equal to 0.40 wt % to less than or equal to 0.75 wt %, greater than or equal to 0.45 wt % to less than or equal to 0.60 wt %, and any ranges and subranges within the preceding ranges. In other embodiments, the glass composition may comprise CuO in amounts from greater than or equal to 0.25 wt % to less than or equal to 0.75 wt %, greater than or equal to 0.30 wt % to less than or equal to 0.75 wt %, greater than or equal to 0.25 wt % to less than or equal to 0.50 wt %, greater than or equal to 0.35 wt % to less than or equal to 0.50 wt %, and any ranges and subranges within the preceding ranges.

To reduce the CuO introduced into the glass composition to $Cu^{+1}$, in some embodiments, certain materials that can serve as reducing agents under glass melting conditions may be added to the glass batch. Reducing agents that may be used in melting glasses may be made from, for example, carbon, carbon monoxide, forming gas, $H_2$, $NH_3$, SiC, SnO, $As_2O_3$, $Sb_2O_3$, and the like. In some embodiments, the reducing agent is SnO due to its environment-friendliness. While $As_2O_3$ and $Sb_2O_3$ can provide the desired reducing effect, they have environmental concerns associated with their use. $SnO_2$, $As_2O_5$ and $Sb_2O_5$ are known as effective glass fining agents as well.

The amount of reducing agents relative to the amount of CuO in the glass composition should be carefully controlled. If too much reducing agent is included, they could reduce $Cu^{+2}$ and $Cu^{+1}$ into its metallic state ($Cu_0$), resulting in the formation of colloidal Cu metal in the glass. Colloidal Cu metal is known to be highly absorbing in large wavelength range in the visible spectrum. Thus, over-reduction of Cu in the glass could lead to insufficient formation of CuX and, thus, inadequate UV-blocking capability, as well as overly low transmission in a large range of the visible spectrum. The net result would be a glass that is too dark to be used by the naked human eye and too weak in protecting naked human eyes due to the inadequate UV-filtering property. In embodiments, the glass composition may comprise a ratio of reducing agent (RA) to CuO that satisfies the following: $0.025 \leq RA/CuO \leq 1.500$. In other embodiments, the glass composition may comprise a ratio of reducing agent (RA) to CuO that satisfies the following: $0.050 \leq RA/CuO \leq 1.250$; $0.100 \leq RA/CuO \leq 1.000$; $0.150 \leq RA/CuO \leq 0.900$; $0.200 \leq RA/CuO \leq 0.850$, or $0.250 \leq RA/CuO \leq 0.800$.

As mentioned above, the UV-blocking capability of the glass of embodiments is provided by the precipitated CuX crystals in the glass. Freshly melted glass produced in a large glass-melting tank, without additional thermal treatment, typically does not have sufficient amount of CuX crystals to provide the desired UV-blocking capability for ophthalmic applications. To impart the formation and precipitation of CuX crystals in the glass of embodiments, it is typically desired that the glass, upon being discharged from the glass furnace and cooled to a relatively low temperature below about 500° C. (such as at around room temperature), is further subjected to heat treatment at a temperature higher than about 500° C., in certain embodiments higher than about 550° C., in certain other embodiments higher than about 600° C., in certain other embodiments higher than about 620° C.

Additionally, halogens may be added to the glass composition to facilitate the formation of CuX and, thereby, provide the desired UV blocking. In embodiments, the glass composition may comprise halogens, such as, for example F, Cl, Br, and I, in amounts from greater than or equal to 0.5 wt % to less than or equal to 5.0 wt %, greater than or equal to 1.0 wt % to less than or equal to 5.0 wt %, greater than or equal to 1.5 wt % to less than or equal to 5.0 wt %, greater than or equal to 2.0 wt % to less than or equal to 5.0 wt %, greater than or equal to 2.5 wt % to less than or equal to 5.0 wt %, greater than or equal to 3.0 wt % to less than or equal to 5.0 wt %, greater than or equal to 3.5 wt % to less than or equal to 5.0 wt %, greater than or equal to 4.0 wt % to less than or equal to 5.0 wt %, greater than or equal to 4.5 wt % to less than or equal to 5.0 wt %, and any ranges and subranges within the preceding ranges. In other embodiments the glass composition may comprise halogens in amounts from greater than or equal to 0.5 wt % to less than or equal to 4.5 wt %, greater than or equal to 0.5 wt % to less than or equal to 4.0 wt %, greater than or equal to 0.5 wt % to less than or equal to 3.5 wt %, greater than or equal to 0.5 wt % to less than or equal to 3.0 wt %, greater than or equal to 0.5 wt % to less than or equal to 2.5 wt %, greater than or equal to 0.5 wt % to less than or equal to 2.0 wt %, greater than or equal to 0.5 wt % to less than or equal to 1.0 wt %, greater than or equal to 0.5 wt % to less than or equal to 1.0 wt %, and any ranges and subranges within the preceding ranges. In yet other embodiments, the glass composition may comprise halogens in amounts from greater than or equal to 1 wt % to less than or equal to 4 wt %, greater than or equal to 2 wt % to less than or equal to 4 wt %, and any ranges or subranges within the preceding ranges.

The combination of CuX and $Ho_2O_3$ in the glass is particularly advantageous. The inclusion of CuX imparts the desired UV-blocking properties without negatively interfering with the light-filtering properties of $Ho_2O_3$. As a result of the combination of both, glasses having the following highly desired properties can be made according to embodiments.

As stated above, the inclusion of $Ho_2O_3$ in the glass composition enhances the contrast between blue and green colors. This enhancement is accomplished by absorbing light having wavelengths of about 450 nm. Successful contrast enhancement is achieved when light transmission at a wavelength of about 450 nm is less than or equal to 75% of light transmitted in the visible spectrum, as represented by the following equation:

$$T_{(450\ nm)} \leq 0.75 T_v,$$

where $T_{(450\ nm)}$ is the transmission measured at a wavelength of about 450 nm, and $T_v$ is the transmission in the visible range measured according to ANSI Z80.3 (2001).

In addition to enhancing the contrast between green and blue colors, glasses according to embodiments block UV light by having copper halides present in the glass composition. In embodiments, the transmission of light having wavelengths less than or equal to about 400 nm is about 0% (i.e., less than 0.2%, for example less than 0.1%, or less than 0.05%, or less than 0.03%, or less than 0.025%, or is even 0.0%), which shows the UV-blocking properties of the glass composition. In some embodiments, the glass composition has a transmission of less than about 1% at wavelengths less than or equal to 420 nm, less than or equal to 415 nm, less than or equal to 412 nm, less than or equal to 410 nm, less than or equal to 408 nm, less than or equal to 406 nm, and any ranges or subranges within the preceding ranges.

The glass of embodiments can be made by melting in a conventional glass tank available in the prior art. The respective raw materials, in desired amounts, optionally together with cullets, are mixed and allowed to melt at a high temperature, fined, discharged from the furnace, pressed, molded, or otherwise shaped, annealed, and then cooled to room temperature. Alternatively, the glass could be melted by the float method. The resultant glass article is then treated in a furnace where it is heated to a temperature higher than about 500° C., where CuX crystals are allowed to form. The glass can then be subjected to down-stream processing, including, but not limited to, scoring, grinding, polishing, coating, and the like. Alternatively, the glass of embodiments may be first pressed, molded or otherwise processed into a near-net-shape product or a net-shaped product before the precipitation of CuX crystals in the glass, and subsequently heat-treated to impart the precipitation of the CuX crystals.

The article of embodiments comprising the glass of various embodiments may be any optical element for manipulating light passing therethrough. Such optical element can be ophthalmic lenses, such as plano sunglass lenses, prescription sunglasses or normal prescription lenses, colored to various tint, to suit the needs of customers and patients. It is also contemplated that the article of embodiments could be an information display device, or part of an information display device, as a light filter in an information display device, and the like. The information display device may be, for example, a handheld device, such as a smart phone or tablet. The glass composition according to embodiments disclosed herein may be formed into articles having a thickness from greater than or equal to 1.0 mm to less than or equal to 2.0 mm, from greater than or equal to 1.0 mm to less than or equal to 1.8 mm, from greater than or equal to 1.0 mm to less than or equal to 1.6 mm, from greater than or equal to 1.0 mm to less than or equal to 1.5 mm, and any range or subrange within the preceding ranges.

A first clause is directed to a UV-blocking glass material comprises precipitated cuprous halide crystals and comprises by weight percent, on an oxide basis: from greater than or equal to 30 wt % to less than or equal to 65 wt % $SiO_2$; from greater than or equal to 12 wt % to less than or equal to 25 wt % $B_2O_3$; from greater than or equal to 3 wt % to less than or equal to 10 wt % $Al_2O_3$; from greater than or equal to 0 wt % to less than or equal to 7 wt % $Na_2O$; from greater than or equal to 0 wt % to less than or equal to 10 wt % $K_2O$; from greater than or equal to 0 wt % to less than or equal to 5 wt % $Li_2O$; from greater than or equal to 0.5 wt % to less than or equal to 10 wt % $Ho_2O_3$; from greater than or equal to 0.25 wt % to less than or equal to 1.50 wt % CuO; and from greater than or equal to 0.5 wt % to less than or equal to 5.0 wt % halogens.

A second clause includes the UV-blocking glass material according to the first clause, wherein the UV-blocking glass material comprises from greater than or equal to 5 wt % to less than or equal to 20 wt % $R_2O$, where $R_2O$ is alkali metal oxides.

A third clause includes the UV-blocking glass material according to the any one of the first and second clauses, further comprising from greater than or equal to 0 wt % to less than or equal to 10 wt % RO, wherein RO is alkaline earth metal oxides.

A fourth clause includes the UV-blocking glass material according to any one of the first through third clauses, further comprising from greater than or equal to 0 wt % to less than or equal to 10 wt % of a member of the group consisting of ZnO, $La_2O_3$, $Ta_2O_3$, $Gd_2O_3$, $Y_2O_3$, $Nb_2O_5$, $WO_3$, $MO_3$, and combinations thereof.

A fifth clause includes the UV-blocking glass material according to any one of the first through fourth clauses, further comprising from greater than or equal to 0 wt % to less than or equal to 10 wt % of a member selected from the group consisting of $CeO_2$, $TiO_2$, $ZrO_2$, and combinations thereof.

A sixth clause includes the UV-blocking glass material according to any one of the first through fifth clauses, further comprising from greater than or equal to 0.0 wt % to less than or equal to 10.0 wt % coloring agents.

A seventh clause includes the UV-blocking glass material according to any one of the first through sixth clauses, wherein the coloring agents are selected from the group consisting of $Nd_2O_3$, $Er_2O_3$, $Pr_2O_3$, $Fe_2O_3$, NiO, CoO, $V_2O_5$, $Cr_2O_3$, and combinations thereof.

An eighth clause includes the UV-blocking glass material according to any one of the first through seventh clauses, further comprising a color filtering agent selected from the group consisting of $Nd_2O_3$, $Er_2O_3$, $Pr_2O_3$, and combinations thereof in an amount from greater than or equal to 0.0 wt % to less than or equal to 25 wt %.

A ninth clause includes the UV-blocking glass material according to any one of the first through eighth clauses, further comprising a reducing agent selected from the group consisting of carbon, carbon monoxide, forming gas, $H_2$, $NH_3$, SiC, SnO, $As_2O_3$, $Sb_2O_3$, and combinations thereof.

A tenth clause includes the UV-blocking glass material according to the ninth clause, wherein the UV-blocking glass material comprises a ratio of reducing agent (RA) to CuO that satisfies the following: $0.025 \leq RA/CuO \leq 1.500$.

An eleventh clause includes the UV-blocking glass material according to the ninth clause, wherein the reducing agent is SnO.

A twelfth clause includes the UV-blocking glass material according to any one of the first through eleventh clauses, wherein a transmission of the UV-blocking glass material when measured on a 1 mm thick sample is less than 0.1% (for example less than 0.05%, less than 0.04%, less than 0.025%, less than 0.01%, or essentially about 0.0%) at wavelengths less than or equal to 400 nm (e.g., at wavelengths of 300 to 400 nm, or 350 nm to 400 nm).

A thirteenth clause includes the UV-blocking glass material according to any one of the first through twelfth clauses, wherein a transmission of the UV-blocking glass material when measured on a 1 mm thick sample is less than or equal to 1% at a wavelength less than or equal to 415 nm.

A fourteenth clause includes the UV-blocking glass material according to any one of the first through thirteenth clauses, wherein a transmission of the UV-blocking glass material at a wavelength of 450 nm satisfies: $T_{(450\ nm)} \leq 0.75 T_v$, wherein $T_{(450\ nm)}$ is a transmission measured at a wavelength of about 450 nm, and $T_v$ is a transmission within a visible range.

A fifteenth clause is directed to an article comprising a UV-blocking glass material comprising precipitated cuprous halide crystals and comprising by weight percent, on an oxide basis: from greater than or equal to 30 wt % to less than or equal to 65 wt % $SiO_2$; from greater than or equal to 12 wt % to less than or equal to 25 wt % $B_2O_3$; from greater than or equal to 3 wt % to less than or equal to 10 wt % $Al_2O_3$; from greater than or equal to 0 wt % to less than or equal to 7 wt % $Na_2O$; from greater than or equal to 0 wt % to less than or equal to 10 wt % $K_2O$; from greater than or equal to 0 wt % to less than or equal to 5 wt % $Li_2O$; from greater than or equal to 0.5 wt % to less than or equal to 10 wt % $Ho_2O_3$; from greater than or equal to 0.25 wt % to less than or equal to 1.50 wt % CuO; and from greater than or equal to 0.5 wt % to less than or equal to 5.0 wt % halogens.

A sixteenth clause includes the article according to the fifteenth clause, wherein the article is a lens for an eyewear product.

A seventeenth clause includes the article according to any one of the fifteenth and sixteenth clauses, wherein the article has a single layer structure.

An eighteenth clause includes article according to any one of the fifteenth and seventeenth clauses, wherein the article is a light filter within an information display device.

A nineteenth clause includes the article according to any one of the fifteenth and seventeenth clauses, wherein the article is a refractive lens element in an optical element.

A twentieth clause includes the article according to any one of the fifteenth through nineteenth clauses, wherein a transmission of the UV-blocking glass material at a wavelength of 450 nm satisfies: $T_{(450\ nm)} \leq 0.75 T_v$, wherein $T_{(450\ nm)}$ is a transmission measured at a wavelength of about 450 nm, and $T_v$ is a transmission within a visible range.

EXAMPLE

Embodiments will be further clarified by the following examples.

The example tests the light transmission of two comparative samples that do not comprise coloring agents or $Ho_2O_3$ (Comparative Samples C1 and C2), two glasses that comprise $Ho_2O_3$ but no coloring agents (Samples 1 and 2), and two glasses that comprise $Ho_2O_3$ and coloring agents (Samples 3 and 4). The compositions of each glass sample are shown in Table 1 below. To form each of the glass samples, the powdered components in the amounts provided in Table 1 below were measured and mixed as dry components in a platinum crucible. The mixture was held at 1250° C. for 30 minutes and subsequently heated to 1350° C. The mixture was melted at 1350° C. for one hour, and then fined at 1350° C. for an additional 45 minutes. Conditioning was then carried out at 1350° C. After conditioning, the samples were delivered at 1350° C. in blocks having a thickness of 6 mm. The glass samples were then annealed for 2 hours at 450° C. After the glass samples were annealed, they were subjected to a heat treatment at the temperature and for the duration shown in Table 1 below. Subsequently, the transmission of the glass samples throughout the visible spectrum ($T_v$), the transmission of the glass samples at wavelengths of 400 nm ($T_{400\ nm}$), the transmission of the glass samples at wavelengths of 450 nm ($T_{450\ nm}$), and the wavelength at which 1% of the light is transmitted ($T_{1\%}$) were measured using standard transmission measurement techniques.

TABLE 1

| | Sample | | | | | |
|---|---|---|---|---|---|---|
| | C1 | C2 | 3 | 4 | 5 | 6 |
| | Central thickness | | | | | |
| | 1 mm | 2 mm | 1 mm | 2 mm | 1 mm | 2 mm |
| | Heat-treatment (° C./min) | | | | | |
| | 600/10 | 650/10 | 600/10 | 650/10 | 600/10 | 600/10 |
| $SiO_2$ (Wt %) | 49.20 | 49.20 | 46.40 | 46.40 | 46.0 | 46.00 |
| $B_2O_3$ | 20.60 | 20.60 | 19.50 | 19.50 | 19.4 | 19.40 |
| $Al_2O_3$ | 8.70 | 8.70 | 8.20 | 8.20 | 8.10 | 8.10 |
| $ZrO_2$ | 3.50 | 3.50 | 3.50 | 3.50 | 3.50 | 3.50 |
| $Li_2O$ | 2.10 | 2.10 | 2.20 | 2.20 | 2.20 | 2.20 |
| $Na_2O$ | 3.40 | 3.40 | 3.80 | 3.80 | 3.70 | 3.70 |
| $K_2O$ | 5.70 | 5.70 | 5.30 | 5.30 | 5.30 | 5.30 |
| BaO | 4.80 | 4.80 | 4.50 | 4.50 | 4.40 | 4.40 |
| $Ho_2O_3$ | | | 3.80 | 3.80 | 3.70 | 3.70 |
| CuO | 0.46 | 0.46 | 0.47 | 0.47 | 0.70 | 0.70 |
| Cl | 0.05 | 0.05 | 0.12 | 0.12 | | |
| Br | 0.85 | 0.85 | 1.65 | 1.65 | 1.97 | 1.97 |
| SnO | 0.51 | 0.51 | 0.66 | 0.66 | 0.94 | 0.94 |
| NiO | | | | | 0.25 | 0.25 |
| CoO | | | | | 0.16 | 0.16 |
| $Cr_2O_3$ | | | | | 0.06 | 0.06 |
| $T_v$ % | 90.7 | 87.2 | 84.2 | 83.0 | 36.5 | 15.4 |
| $T_{400\ nm}$ | 0 | 0 | 0 | 0 | 0 | 0 |
| $T_{1\%}$ | 408 | 408 | 415 | 411 | 414 | 403 |
| $T_{450\ nm}$ | 90.0 | 85.4 | 18.0 | 26.0 | 19.0 | 4.2 |
| 0.75 $T_v$ % | 68.0 | 65.4 | 63.2 | 62.3 | 27.4 | 11.6 |
| $T_{(450\ nm)} \leq$ 0.75 $T_v$ | Fails | Fails | Pass | Pass | Pass | Pass |

Figure 2:
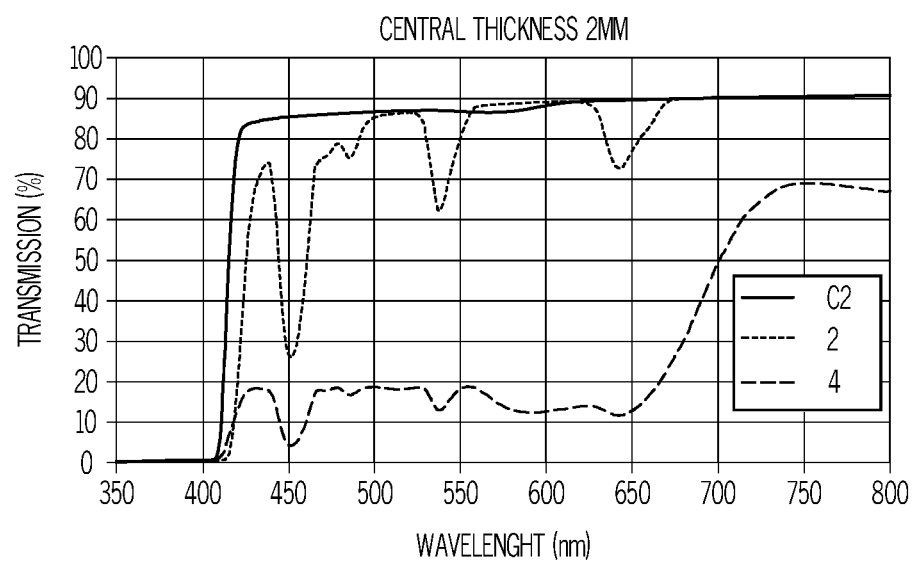
FIG. 2 is a plot of spectrums in the visible wavelength range for comparative glass samples and glass samples according to embodiments disclosed and described herein having a thickness of 2 mm.

From the above samples, it can be seen that comparative sample glasses C1 and C2 illustrate typical UV absorption obtained by copper halide precipitation, which results from the presence of $B_2O_3$ in the batch materials and the heat treatment. However, because there is no $Ho_2O_3$ in the glasses of the comparative samples, they do not provide any contrast enhancement, which is evident by the high transmission at a wavelength of 400 nm. The transmission of the comparative samples glasses can also be seen in FIG. 1 and FIG. 2. The transmission of glass samples having a thickness of 1 mm (i.e., comparative sample C1, sample 1, and sample 3) are shown in FIG. 1. As shown in FIG. 1 the glass of comparative sample C1 has low transmission at wavelengths corresponding to the UV spectrum (i.e., at wavelengths of less than or equal to 408 nm, but has high and relatively constant transmission at wavelengths within the visible light spectrum. Similarly, FIG. 2 shows the transmission of glass samples having a thickness of 2 mm (i.e., comparative sample C2, sample 2, and sample 4). FIG. 2 shows that the glass of comparative sample C2 has low transmission at wavelengths corresponding to the UV spectrum (i.e., at wavelengths of less than or equal to 408 nm), but has high and relatively constant transmission at wavelengths within the visible light spectrum.

In contrast to comparative samples C1 and C2, the glasses of samples 1 and 2 show contrast enhancement obtained by adding an adequate amount of $Ho_2O_3$ into a composition similar to the composition of comparative samples C1 and C2. The contrast enhancement is shown by the lower transmission at a wavelength of 450 nm compared with the transmission within the rest of the visible spectrum in samples 1 and 2. However, the optical performances are similar to the glasses of comparative samples C1 and C2 that do not include $Ho_2O_3$. FIG. 1 and FIG. 2 show that the transmission of samples 1 and 2 closely mimic the transmission of comparative samples 1 and 2, with the exception of the low transmission for samples 1 and 2, at a wavelength of about 450 nm, which provides the contrast enhancement. Also, like the glasses of comparative samples C1 and C2, the glasses of samples 1 and 2 have low transmission at wavelengths within the UV spectrum (i.e., wavelengths of less than or equal to 415 nm and less than or equal to 414 nm, respectively).

In glasses of samples 3 and 4, some usual coloring agents were added to decrease the visible transmission in a practical range for sunglass purpose (Class 2 in ANSI Z80.3 norm). The coloring agent(s) added to samples 3 and 4 do not affect either UV blocking or contrast enhancing properties. Color and visible transmission can be adjusted optical properties and color. This is shown in FIG. 1 and FIG. 2, where it is shown that the glasses of samples 3 and 4 block light at wavelengths within the UV spectrum (i.e., at wavelengths less than or equal to 411 nm and less than or equal to 403 nm, respectively). Also, as shown in FIGS. 1 and 2, the glasses of samples 3 and 4 also have low transmission at a wavelength of about 450 nm.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A UV-blocking glass material comprising precipitated cuprous halide crystals and comprising by weight percent, on an oxide basis:
   from greater than or equal to 30 wt % to less than or equal to 65 wt % $SiO_2$;
   from greater than or equal to 12 wt % to less than or equal to 25 wt % $B_2O_3$;
   from greater than or equal to 3 wt % to less than or equal to 10 wt % $Al_2O_3$;
   from greater than or equal to 0 wt % to less than or equal to 7 wt % $Na_2O$;
   from greater than or equal to 0 wt % to less than or equal to 10 wt % $K_2O$;
   from greater than or equal to 0 wt % to less than or equal to 5 wt % $Li_2O$;
   from greater than or equal to 0.5 wt % to less than or equal to 10 wt % $Ho_2O_3$;
   from greater than or equal to 0.25 wt % to less than or equal to 1.50 wt % CuO; and
   from greater than or equal to 0.5 wt % to less than or equal to 5.0 wt % halogens.

2. The UV-blocking glass material according to claim 1, wherein the UV-blocking glass material comprises from greater than or equal to 5 wt % to less than or equal to 20 wt % $R_2O$, where $R_2O$ is alkali metal oxides.

3. The UV-blocking glass material according to claim 1, further comprising from greater than or equal to 0 wt % to less than or equal to 10 wt % RO, wherein RO is alkaline earth metal oxides.

4. The UV-blocking glass material according to claim 1, further comprising from greater than or equal to 0 wt % to less than or equal to 10 wt % of a member of the group consisting of ZnO, $La_2O_3$, $Ta_2O_3$, $Gd_2O_3$, $Y_2O_3$, $Nb_2O_5$, $WO_3$, $MO_3$, and combinations thereof.

5. The UV-blocking glass material according to claim 1, further comprising from greater than or equal to 0 wt % to less than or equal to 10 wt % of a member selected from the group consisting of $CeO_2$, $TiO_2$, $ZrO_2$, and combinations thereof.

6. The UV-blocking glass material according to claim 1, further comprising from greater than or equal to 0.0 wt % to less than or equal to 10.0 wt % coloring agents.

7. The UV-blocking glass material according to claim 6, wherein the coloring agents are selected from the group consisting of $Nd_2O_3$, $Er_2O_3$, $Pr_2O_3$, $Fe_2O_3$, NiO, CoO, $V_2O_5$, $Cr_2O_3$, and combinations thereof.

8. The UV-blocking glass material according to claim 1, further comprising a color filtering agent selected from the group consisting of $Nd_2O_3$, $Er_2O_3$, $Pr_2O_3$, and combinations thereof in an amount from greater than or equal to 0.0 wt % to less than or equal to 25 wt %.

9. The UV-blocking glass material according to claim 1, wherein the UV-blocking glass material comprises a ratio of reducing agent (RA) to CuO that satisfies the following:

$$0.025 \leq RA/CuO \leq 1.500.$$

10. The UV-blocking glass material according to claim 9, wherein the reducing agent is SnO.

11. The UV-blocking glass material according to claim 1, wherein a transmission of the UV-blocking glass material when measured on a 1 mm thick sample is essentially about 0.0% at wavelengths less than or equal to 400 nm.

12. The UV-blocking glass material according to claim 1, wherein a transmission of the UV-blocking glass material when measured on a 1 mm thick sample is less than or equal to 1% at a wavelength less than or equal to 415 nm.

13. The UV-blocking glass material according to claim 1, wherein a transmission of the UV-blocking glass material at a wavelength of 450 nm satisfies:

$$T_{(450\ nm)} \leq 0.75 T_v,$$

wherein $T_{(450\ nm)}$ is a transmission measured at a wavelength of about 450 nm, and $T_v$ is a transmission within a visible range measured according to ANSI Z80.3 (2001).

14. An article comprising a UV-blocking glass material comprising precipitated cuprous halide crystals and comprising by weight percent, on an oxide basis:
   from greater than or equal to 30 wt % to less than or equal to 65 wt % $SiO_2$;

from greater than or equal to 12 wt % to less than or equal to 25 wt % $B_2O_3$;

from greater than or equal to 3 wt % to less than or equal to 10 wt % $Al_2O_3$;

from greater than or equal to 0 wt % to less than or equal to 7 wt % $Na_2O$;

from greater than or equal to 0 wt % to less than or equal to 10 wt % $K_2O$;

from greater than or equal to 0 wt % to less than or equal to 5 wt % $Li_2O$;

from greater than or equal to 1 wt % to less than or equal to 4 wt % $Ho_2O_3$;

from greater than or equal to 0.25 wt % to less than or equal to 1.50 wt % CuO; and from greater than or equal to 0.5 wt % to less than or equal to 5.0 wt % halogens.

15. The article according to claim 14, wherein the article is a lens for an eyewear product.

16. The article according to claim 14, wherein the article has a single layer structure.

17. The article according to claim 14, wherein the article is a light filter within an information display device.

18. The article according to claim 14, wherein the article is a refractive lens element in an optical element.

19. The article according to claim 14, wherein a transmission of the UV-blocking glass material at a wavelength of 450 nm satisfies:

$$T_{(450\ nm)} \leq 0.75 T_v,$$

wherein $T_{(450\ nm)}$ is a transmission measured at a wavelength of about 450 nm, and $T_v$ is a transmission within a visible range measured according to ANSI Z80.3 (2001).

* * * * *